United States Patent
Otero Diaz et al.

(10) Patent No.: US 9,594,493 B2
(45) Date of Patent: Mar. 14, 2017

(54) GRAPHICAL USER INTERFACE WITH DIAL CONTROL FOR A PARAMETER

(71) Applicant: Microsoft Corporation, Redmond, WA (US)

(72) Inventors: Ana Lilia Otero Diaz, Woodinville, WA (US); Ramona Canan, Bellevue, WA (US); Orry Soegiono, Bellevue, WA (US); Yang Liu, Seattle, WA (US); Benjamin Smith, Seattle, WA (US); Kshitij Mehta, Redmond, WA (US); Meghan McNeil, Seattle, WA (US); William Carr, Redmond, WA (US); Bede Jordan, Seattle, WA (US); Jesse Bishop, Woodinville, WA (US); Hamid Mahmood, Bellevue, WA (US); Steven Abrahams, Seattle, WA (US); Jeff West, Seattle, WA (US); Geoffrey T. Ebersol, Bellevue, WA (US); Susmitha Kothari, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 152 days.

(21) Appl. No.: 13/904,872

(22) Filed: May 29, 2013

(65) Prior Publication Data
US 2014/0359508 A1 Dec. 4, 2014

(51) Int. Cl.
*G06F 3/0484* (2013.01)
*G06F 3/0482* (2013.01)
*G06F 3/0488* (2013.01)

(52) U.S. Cl.
CPC ........ *G06F 3/04847* (2013.01); *G06F 3/0482* (2013.01); *G06F 3/04883* (2013.01)

(58) Field of Classification Search
CPC ..................................................... G06F 3/0484
(Continued)

(56) References Cited

U.S. PATENT DOCUMENTS

| 5,798,760 A | 8/1998 | Vayda et al. |
| 2006/0022956 A1 | 2/2006 | Lengeling et al. |

(Continued)

FOREIGN PATENT DOCUMENTS

| DE | 102011084802 A1 | 4/2013 |
| EP | 1536315 A1 | 6/2005 |

(Continued)

OTHER PUBLICATIONS

"International Search Report & Written Opinion for PCT Patent Application No. PCT/US2013/061061", Mailed Date: Dec. 4, 2013, Filed Date: Sep. 20, 2013, 12 Pages.

(Continued)

*Primary Examiner* — David Choi
(74) *Attorney, Agent, or Firm* — Bryan Webster; Dan Choi; Micky Minhas (57) ABSTRACT

A graphical user interface for a computer includes a dial control. The control can be implemented, for example, as a touch-based, pointer-based, pen-based and/or keyboard-based mechanism. The dial control is intended for manipulating a large range of values, such as a menu of items from which a user makes a selection, or a range of continuous or discrete values. A dial control can replace other control types such as a slider, drop down menu or text field. The graphical elements of the dial control include one or more displayed rings and a handle for each ring. Inside the ring, or in another area adjacent the ring, a value can be displayed. The ring can be manipulated by the user to change the value selected by the dial control. In the case of multiple rings, each ring can be manipulated independently.

20 Claims, 8 Drawing Sheets (58) Field of Classification Search
USPC ........................................................ 715/771
See application file for complete search history.

(56) References Cited

U.S. PATENT DOCUMENTS

| | | | |
|---|---|---|---|
| 2006/0026521 A1 | 2/2006 | Hotelling et al. | |
| 2007/0261001 A1 | 11/2007 | Nagiyama et al. | |
| 2008/0016468 A1 | 1/2008 | Chambers et al. | |
| 2008/0059913 A1 | 3/2008 | Burtner et al. | |
| 2010/0083190 A1* | 4/2010 | Roberts | G06F 3/04883 715/863 |
| 2012/0092267 A1* | 4/2012 | Haug | G06F 3/0383 345/173 |
| 2012/0173983 A1 | 7/2012 | Song | |
| 2012/0306788 A1* | 12/2012 | Chen | G06F 3/04883 345/173 |
| 2013/0174092 A1* | 7/2013 | Li | G06F 3/04847 715/823 |
| 2013/0222394 A1* | 8/2013 | Fyke | G06T 11/60 345/467 |
| 2014/0109019 A1* | 4/2014 | Rana | G06F 3/033 715/863 |
| 2014/0170616 A1* | 6/2014 | Kovacs | G09B 19/00 434/219 |
| 2014/0313135 A1* | 10/2014 | Pisters | G06F 3/04883 345/173 |
| 2014/0359508 A1* | 12/2014 | Otero Diaz | G06F 3/0482 715/771 |

FOREIGN PATENT DOCUMENTS

| | | |
|---|---|---|
| EP | 1841188 A2 | 10/2007 |
| WO | 2011093678 A3 | 12/2011 |

OTHER PUBLICATIONS

Smith, et al., "The Radial Scroll Tool: Scrolling Support for Stylus- or Touch-Based Document Navigation", Retrieved at <<http://eprints.soton.ac.uk/259247/3/smith_scrhraefelUIST04radialScroll.pdf>>, In Proceedings of 17th Annual ACM Symposium on User Interface Software and Technology, Oct. 27, 2004, pp. 4.

* cited by examiner

| Property | Default value |
|---|---|
| StartAngle | 0.0 |
| ArcAngle | 0.0 |
| InnerRadius | 0.0 |
| OuterRadius | 1.0 |
| MappingMode | Relative |
| OuterOutlineThickness | 0.0 |
| OuterOutlineBrush | null |
| Width | NaN |
| Height | NaN |
| Foreground | null |
| Background | null |

| InnerRadius | 0.0 |
|---|---|
| OuterRadius | 1.0 |
| MappingMode | Relative |
| OuterOutlineBrush | null |
| Over360Foreground | null |
| MinAngle | 0 |
| MaxAngle | 360 |
| FillOn0 | false |
| FillOn360 | true |
| IsContinuous | true |
| HomeValue | 0.0 |
| EndValue | 0.0 |
| ThumbStyle | null |
| ShowDarkerForegroundOver360 | false |
| AnimationsEnabled | true |
| RepositionAndHideOnRelease | false |
| SmallChange | 0.0 |
| LargeChange | 0.0 |
| Minimum | 0.0 |
| Maximum | 100.0 |
| Value | 0.0 |
| Width | NaN |
| Height | NaN |
| Foreground | null |
| Background | null |
| Angle * | 0.0 |

GRAPHICAL USER INTERFACE WITH DIAL CONTROL FOR A PARAMETER

BACKGROUND

A graphical user interface on a computer, whether a desktop computer, portable computer, tablet, slate or handheld device, or server computer, generally provides several mechanisms for a user to enter various inputs to the computer, including but not limited to data for applications, values for parameters and settings, and the like. Such mechanisms generally include one or more graphical elements that are displayed. The displayed graphical elements are modified on the display based on user input, to communicate to the user, for example, various information and to indicate back to the user any inputs or selections made by the user. How the graphical elements and selected values change in response to user input is the behavior of the graphical user interface. The process of rendering and displaying such changes to a mechanism in a graphical user interface is called animation.

Such mechanisms in graphical user interfaces generally are touch-based and/or pointer-based and/or keyboard-based mechanisms. A touch-based mechanism is configured to respond to a user's touch on a touchscreen or other touch sensitive device, which in turn provides position and motion information. A pointer-based mechanism is configured to respond to a user's manipulation of an input device which in turn controls the position and motion of a cursor on a display. Some mechanisms in graphical user interfaces are designed to be any of touch-based and pointer-based and keyboard-based mechanisms, depending on the input devices attached to the computer.

There are a few kinds of graphical user interfaces that allow a user to enter values within a large range, or to select values within a large set of options. For example, a text field can allow a user to enter a value directly. As another example, a "slider" is a vertically or horizontally oriented line on which a user manipulates a control. The position of the control along the line represents a value selected by the user, and the length of the line represents the range of possible values. As another example, a menu can be presented to a user, which the user can manipulate to view and locate a value to be selected. Such interfaces can be cumbersome to use on small graphical user interfaces, especially touch-based interfaces, and often lack precision where a large range of values is represented.

SUMMARY

This Summary introduces selected concepts in simplified form that are further described below in the Detailed Description. This Summary is intended neither to identify key or essential features of the claimed subject matter, nor to limit the scope of the claimed subject matter.

A graphical user interface for a computer includes a dial control. Such a control is implemented to work with related mechanical controls, such as a touch-based, pointer-based, pen-based and/or keyboard-based mechanism. The dial control can be used, for example, for manipulating a large range of values, such as a menu of items from which a user makes a selection, or a range of continuous or discrete values. A dial control can replace other control types such as a slider, drop down menu or text field.

The graphical elements of the dial control include one or more displayed rings and a handle for each ring. Inside the ring, or in another area adjacent the ring, a value can be displayed. The ring can be manipulated by the user to change the value selected by the dial control. A user also can enter a value, and the ring can be animated to represent the entered value. An application also may have state that determines the value, and the ring can animated to represent the current value.

To manipulate a ring, the user manipulates the handle for the ring. In the case of multiple rings, each ring can be manipulated independently. The handle position is in an initial position that can be determined in a number of ways. For example, the initial position can be based on a currently set value within the range of values represented by the ring. As another example, the initial position can be based on a cursor position or touch position at the time the ring is selected by the user.

Various behaviors can be associated with the manipulation of the ring. For example, motion in one direction can result in decreasing the selected value, whereas motion in the other direction can result in increasing the selected value. As another example, with such a dial control, a fixed start or stop, or beginning or end, of the control can be eliminated. Multiple revolutions of the ring can be given different meanings. For example, selection from a large range of values can be given more precision, or more natural selection, by representing the range of values by multiple revolutions of a ring. The meaning of a manipulation of the ring can be a function of the speed, direction, number of revolutions and/or distance of the motion.

Additionally, animation of a dial control can include complex trigonometric functions because of rotational transforms applied to graphical elements. In some cases, rotating graphical elements that overlap each other when displayed can result in display artifacts. Animation techniques are described to reduce such artifacts.

A dial control can have other animation, such as showing or hiding the dial control, snapping the dial control to an initial value, and the like. The animations for the dial control can be programmed in a separate thread from the rest of the user interface of an application using the dial control. Such an animation thread can be offloaded from a main central processing unit to a graphic processing unit to improve the user experience for the application.

Such a dial control can be used in a variety of applications, such as a timer, a clock, a stopwatch or other features relating to selecting a time or a time span, such as in an alarm or similar application. Graphics applications such as a photo editor or paint application can use such a control for various settings, such as contrast, brightness, tint, temperature or other controls.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which a computer with a graphical user interface including a dial control can be implemented.

Figure 1:
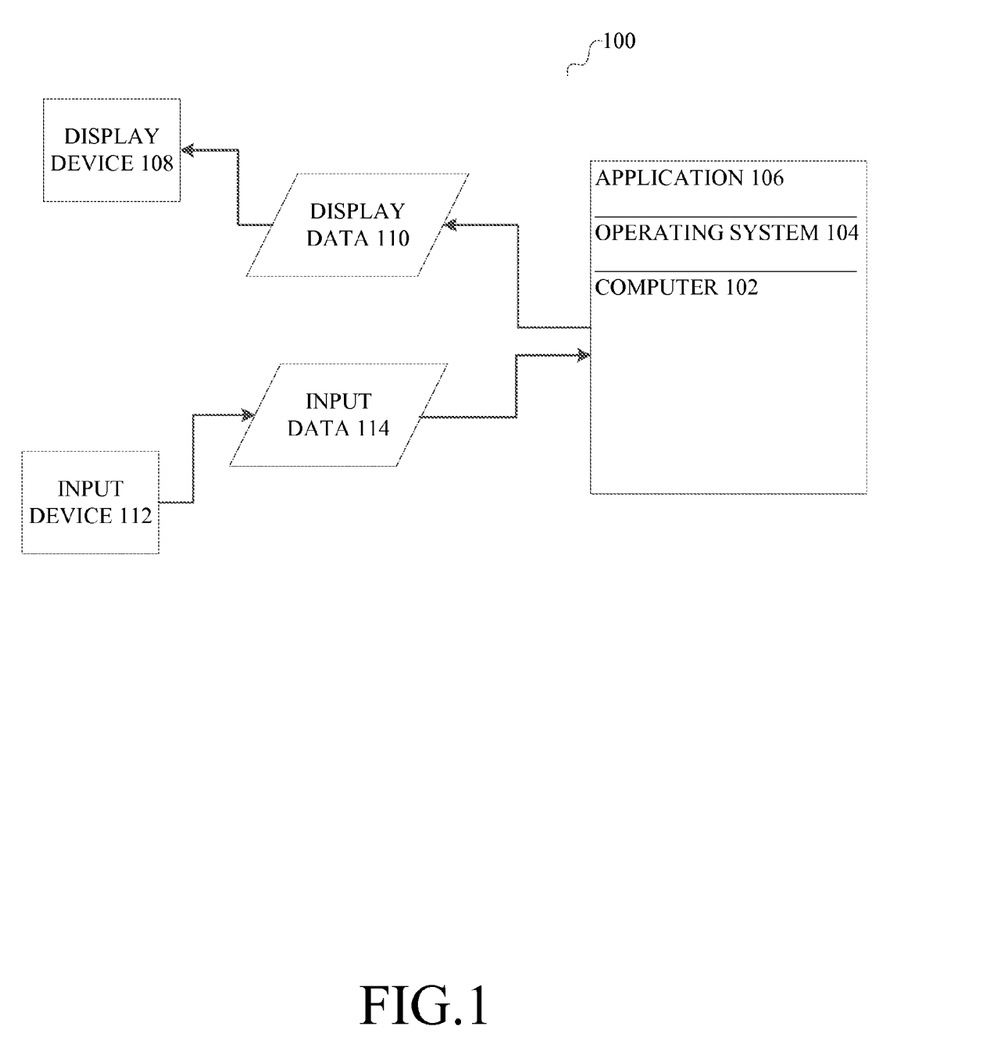
FIG. 1 is a block diagram of an example system in which a computer with a graphical user interface including a dial control can be implemented.

Referring to FIG. 1, a computer system 100 includes one or more computers 102, which can be implemented as described below in connection with FIG. 9. The computer has an operating system 104 which manages access to the various computing resources of FIG. 9 by applications 106. The operating system 104 is a computer program that is executed by the computer. The applications 106 also are computer programs that are designed to run on the computer with their access to the computer resources managed by the operating system.

The computer programs, such as applications or the operating system, executed by the computer can provide a graphical user interface through which a user interacts with the computer. A display device 108 receives display data 110 from the computer to be displayed. Input devices 112 (which can be integrated with a display device, in some cases, such as a touchscreen), provide user input data 114 to the computer.

In one implementation, the display device 108 merely displays data as generated by the application or the operating system of the computer 102. In another implementation, the display device, along with input device 112, can be part of another computer, such as described in FIG. 9, which is programmed to display information to a user. For example, the display device 108 can include a computer executing a browser application that communicates with computer 102 over a computer network. In such a case, the display data 110 from the computer is in a form that the display device 108 can render and display for the user. In this implementation, some of the animation or implementation of the user interface behavior can reside in the display device 108.

In such an environment, the computer system 100 has a graphical user interface that includes a dial control, such as described in more detail below. The dial control can be, for example, part of one or more applications running on the computer or part of the operating system.

Various behaviors can be associated with the manipulation of the ring. For example, motion of the handle in one direction can result in decreasing the selected value, whereas motion of the handle in the other direction can result in increasing the selected value. As another example, with such a dial control, a fixed start or stop, or beginning or end, of the control can be eliminated. Multiple revolutions of the handle around the ring can be given different meanings. For example, selection from a large range of values can be given more precision, or more natural selection, by representing the range of values by multiple revolutions of a handle around a ring. The meaning of a manipulation of the ring can be a function of the speed, direction, number of revolutions and/or distance of the motion.

The dial control can be implemented, for example, to manipulate a value in a range of values, such as time, manipulate a menu of items, or provide control information to an application. For example, an alarm application can allow a user to select a time using dial control. Two rings can be used: one for hours, one for minutes. A stopwatch application can display a time using a dial control. Three rings can be used: one for hours, one for minutes, one for seconds. A similar dial control can be used to select a time span in hours, minutes and seconds. A similar dial control can be used for a clock to both set and display a current time.

In a dial control for selecting a time, such as in an alarm or clock, multiple revolutions of the handle of the ring can be used in a twenty-four hour mode for time. A first revolution can represent hours 0-11, whereas a second revolution can represent hours 12-23, with a wrap-around occurring from 0 to 23 or 23 to 0 as the case may be. The color of the ring can be used to signify which revolution is currently represented by the dial control.

As another example, the dial control can be used to provide settings for an application. In a photo editor, a separate dial control can be provided for each adjustable parameter, such as brightness, temperature, contrast, tint and so on.

In various applications, the dial control can be animated in response to a user moving the handle to set a value, or in response to a changing value represented by the dial control such as current time, or in response to a value represented by the dial control being set elsewhere such as in a text interface. The dial control also can be animated to appear and disappear when it is activated and deactivated.

The animations for the dial control can be programmed in a separate thread from the rest of the user interface of an application using the dial control. Such an animation thread can be offloaded from a main central processing unit to a graphic processing unit to improve the user experience for the application.

Given this context, an example implementation of such dial control will be described in more detail in connection with FIGS. 2-8.

Figure 2:
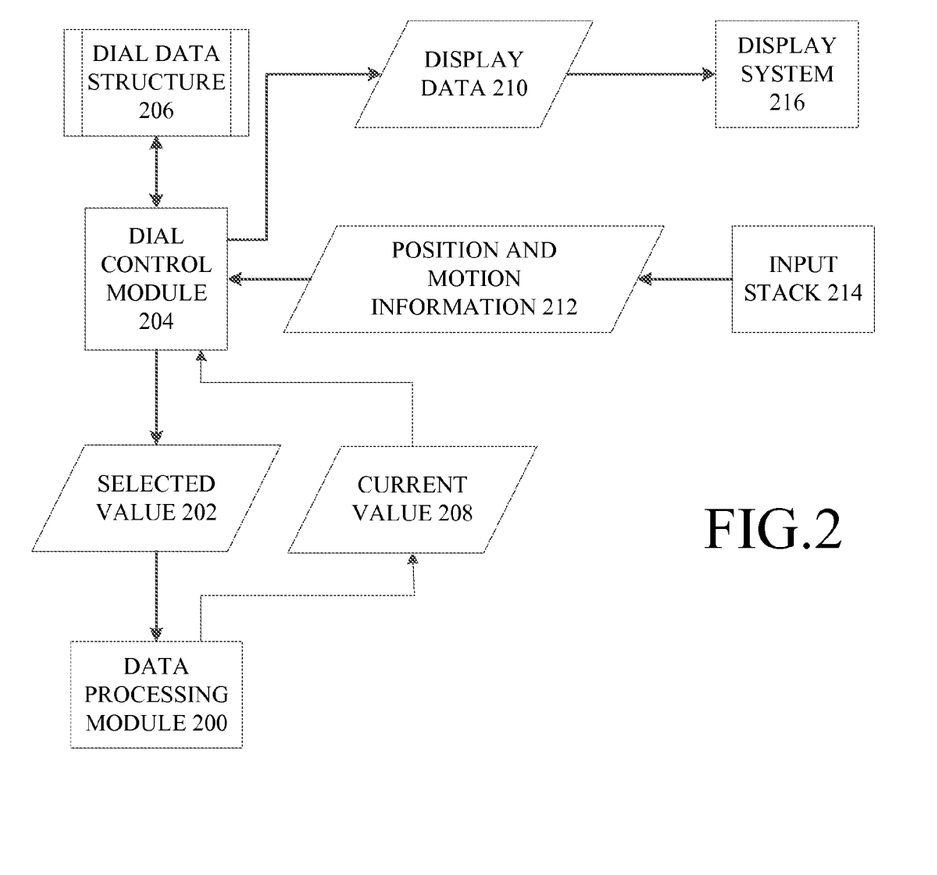
FIG. 2 is a data flow diagram illustrating an example implementation of graphical user interface with a dial control.

FIG. 2 is a data flow diagram illustrating an example implementation of graphical user interface with a dial control.

A data processing module 200 is part of an application or the operating system that performs various data processing tasks, using a selected value 202 that can be manipulated by a user through a dial control in a graphical user interface. A dial control module 204 maintains a data structure 206 in memory that specifies various aspects of the dial control, which will be described in more detail below. The data processing module 200 can provide the dial control module with a current value 208, but some implementations can omit this.

Figure 3:
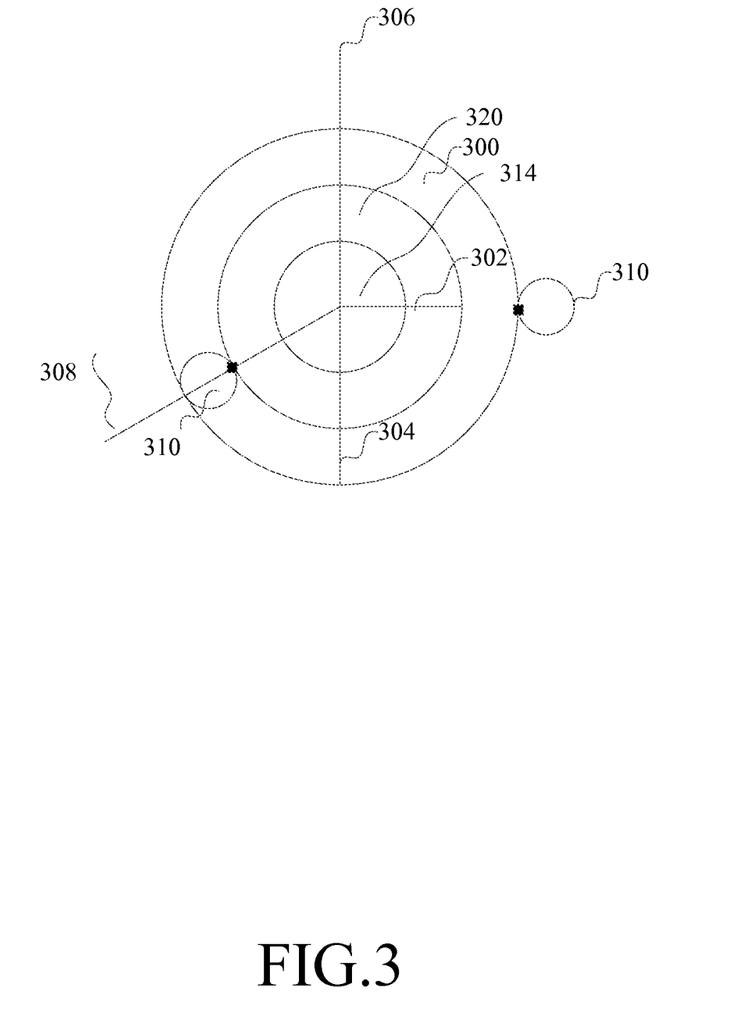
FIG. 3 is a diagram of example graphical elements of a dial control.

The dial control module 204 generates display data 210 that includes the graphical elements of the dial control, based on the data structure 206 and position and motion information 212. The position and motion information is provided by an input stack 214, which generates such information based on input from an input device (not shown). The display data is provided to a display system 216 which renders the dial control on a display (not shown). A user views the dial control on the display and manipulates it using the input device. The dial control module 204 implements the behavior of the dial control in response to the user input, causing the dial control to be animated on the display through the display system Referring now to FIG. 3, example graphical elements for a dial control will now be described. FIG. 3 shows an implementation where the graphical elements of the dial control includes two concentric rings 300 and 320. To simplify, characteristics of one of these rings will be described, and they should be considered to apply to the other ring as well. A ring 300 has an inner radius 302 and an outer radius 304. A ring also has a start angle 306 and a current angle 308 (for ring 320), with respect to a reference. The ring can be visibly different, such as with different color or texture, between the start angle and current angle in one direction and between the start angle and the current angle in the other direction.

The dial control's graphical elements also include a handle 310 for each ring. The handle is associated with the angle representing the currently selected value for the range of values represented by the dial control. The current angle, for example, is defined by a formula of (current value* ((maximum angle−minimum angle)/(maximum value−minimum value))), where the maximum angle is the maximum angle handled by the dial control (typically 360°), the minimum angle is the minimum angle handled by the dial control (typically 0°), the maximum value is the maximum value in the range of values represented by the dial control, and the minimum value is the minimum value in the range of values represented by the dial control. A handle can have any shape; in FIG. 3, it is shown as a circle. Note that the handle in FIG. 3 has a connector 312. Graphical data defining the handle is therefore subjected to a rotation transform so as to position the connector 312 correctly with respect to the current angle.

The center of the ring 314 also can be used for a variety of purposes. For example, a current value can be displayed at the center of the ring. The center of the ring can also be used as a selector for the current value, such that when this space is manipulated by a user, such as by touch or a pointing device, the current value represented by the dial control is selected.

Given these graphical elements, the behavior of the dial control can be described as follows. A user manipulates the handle 310, either through a touch-based interface or a pointer-based interface. Keyboard or similar manipulations also may be used as described in more detail below.

As an example implementation, in a touch-based interface, the handle is displayed at a position on a touchscreen. The user touches the screen where the handle is displayed, and moves the handle with a circular motion. Similarly, in an example pointer-based interface implementation, the user positions a cursor on the handle with a pointing device such as a mouse, and then selects and drags the handle in a circular motion. A scroll wheel, or similar mechanism, on the pointing device also can be used to change the position of the handle.

Some additional keyboard-based behaviors, for example, include rotating the handle in response to a user pressing different keys. For example, "home" and "end" keys, when pressed, can cause the handle to be rotated to a start or end angle for the ring. "Page up" and "Page down" keys, or arrow keys, for example, when pressed by the user can cause the handle to be rotated in increments. Some keys can be set to provide small increments, whereas others can be set to provide larger increments.

The current position of the handle on the ring is mapped to a value. This value can be displayed in the center of the ring. If the user decides to select the current value, this decision can be effected by the user manipulating the center of the ring, such as by a single tap on the center of the ring or by a similar gesture with a pointing device. A keyboard implemented indication of selection also can be provided, for example, by using the "enter" key.

Figure 4:
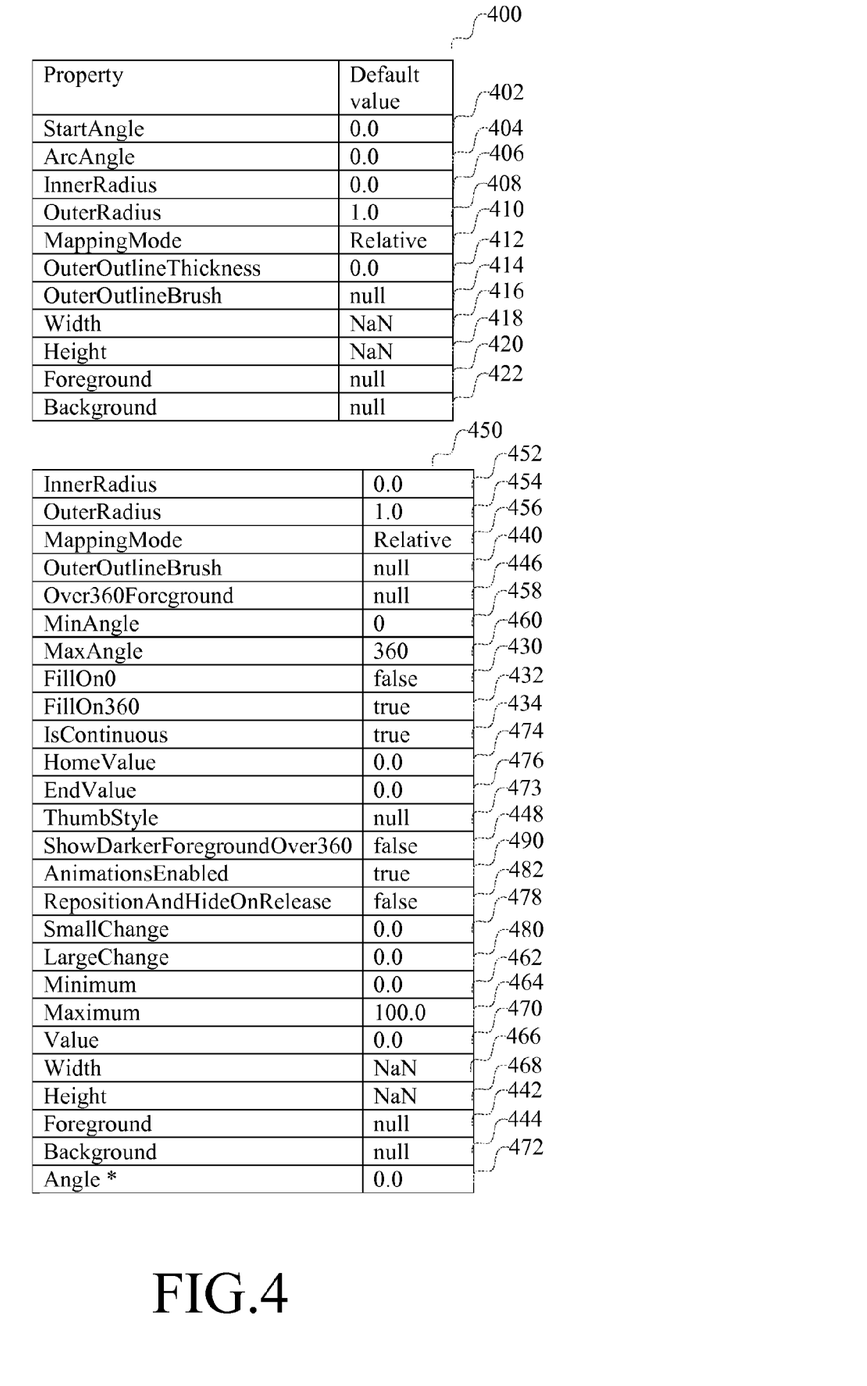
FIG. 4 is a diagram of a data structure representing a dial control

An example of a data structure for representing a dial control will now be described in connection with FIG. 4.

The dial control can be defined by a data structure that specifies a collection of one or more circular sliders 450. Each circular slider includes a ring slice 400 and a handle.

A ring slice 400 is defined by a start angle 402, indicating an angle to start painting a ring, and an arc angle 404 indicating a radial length of an arc. A half ring is defined by a start angle of 0 and an arc angle of 180. A full ring is defined by a start angle of 0 and an arc angle of 360. The ring slice also has an inner radius 406 and an outer radius 408, indicating the distance from the center or origin for the arc and its inner and outer outlines, respectively. A mapping mode 410 indicates whether the values for the inner and outer radii are relative or absolute. For example, an absolute value can define this distance in pixels. A relative value can define this distance in terms of a function of another property, such as the height and width of a bounding box for the ring.

A ring slice also can have an outer outline with a thickness 412 in pixels, and information about its graphics, such as a brush type 414. The ring slice also has a bounding box with a width 416 and height 418. The ring slice also has a foreground color 420 and a background color 422. The foreground color defines, for example, the color of the ring between the start angle and a current angle in a clockwise direction, whereas the background color can define the color of the ring between the start angle and the current angle in the other direction.

The circular slider 450 similarly is defined by an inner radius 452 and outer radius 454, which can be defined in a relative or absolute manner as indicated by the mapping mode 456. The ring slice within a circular slider obtains its inner and outer radii values from the circular slider. A minimum angle 458 and a maximum angle 460 supported by the circular slider, and minimum and maximum values 462, 464 for the range of values represented by the circular slider also can be specified. If the dial control represents a continuous range of values, this can be specified at 434. The width 466 and height 468 define the bounding box of the circular slider. The current value is specified at 470, which determines the current angle 472 by the function described above. Another value 473 can indicate a handle style to be applied to the circular slider, which refers indirectly or directly to the graphical element for the handle.

A variety of behavioral properties also can be defined. For example, a home value 474 and an end value 476 indicate the values to which the control is set when the user presses the home and end keys, respectively. Similar values can be set for other keys. A "small change" value 478 and a "large change" value 480. Another value 482 can indicate whether the handle is moved back to the start angle or a default angle, or stays in position, if the user releases the handle.

Other data can be used to define parameters regarding the display of the control. For example, the outer outline can be defined by a brush which is specified at 440. A background 442 and foreground 444 also can be specified. Whether the appearance of the control changes when the current angle passes 360 degrees, can be specified by providing a different foreground as indicated at 446 or by specifying a darker foreground as indicated at 448. If the current angle is 0 or 360 degrees, the dial control can have a fill specified, as indicated at 430 and 432. Finally, whether the dial control has various animations enabled is specified at 490.

Figure 5:
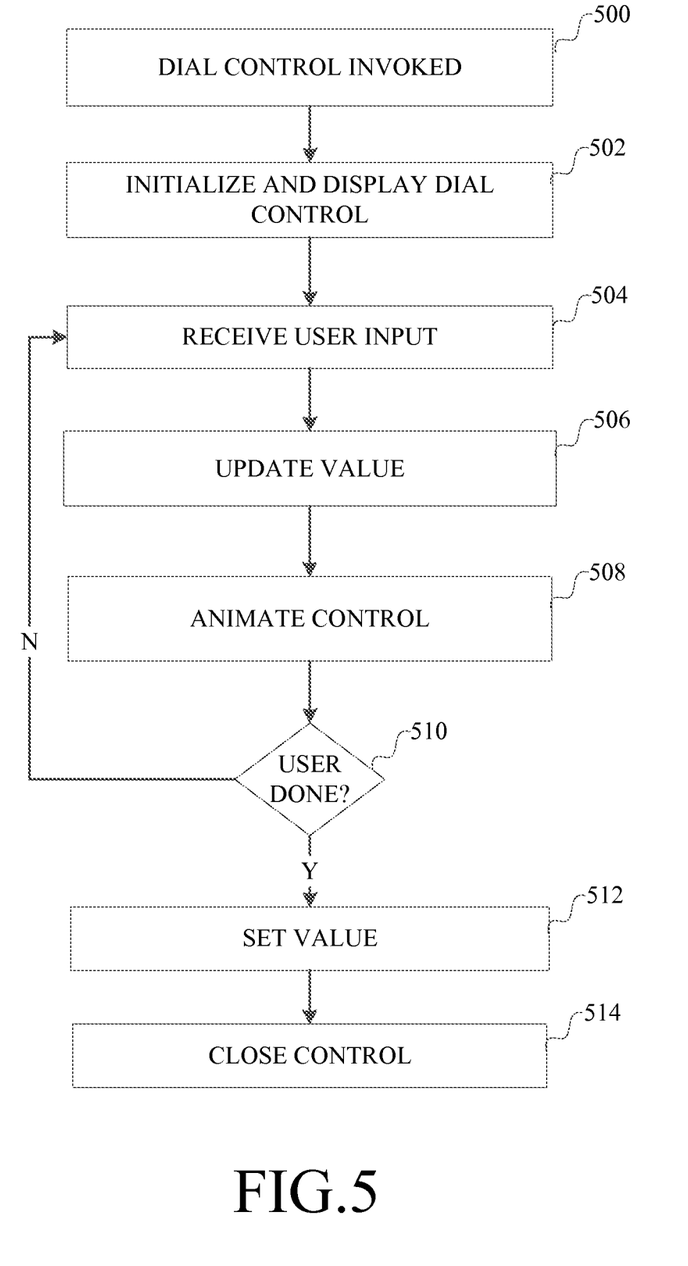
FIG. 5 is a flow chart describing behavior of a dial control.

A flow chart describing an example implementation of the behavior of the dial control will now be described in connection with FIG. 5.

In response to a user action, the dial control is invoked 500. The user action can be the selection of a value to edit for example. The dial control is initialized and displayed 502 using the current value, if any, and other data stored for in the data structure for the dial control.

The system then responds to user input. In particular, the system receives 504 input in response to the user manipulating the control. The corresponding selected value is updated 506 based on the user manipulation. The update to the value and the update to the current angle can be a function of the speed, direction and distance determined for the user manipulation. The value may remain the same if the user has already reached a limit for the control. The control is animated 508 in accordance with the user manipulation to the updated value. This may include generating multiple views of the control between the previous value and the current value to provide for a smooth animation. If the user indicates that the user is done using the control, as indicated at 510, for example by touching the center of the dial, or by pressing a key such as "enter" or "cancel", then the value is set 512 and the control can be closed 514. Otherwise, the system continues to respond to the user's manipulations as indicated at 504.

A flow chart describing an example implementation for animating the dial control will now be described in connection with FIGS. 6-8.

Dial control animation depends on the desired look of the dial control. In the examples in FIG. 3, each ring of the dial control is displayed such that it has one color from a start angle to a current angle along one direction of the arc, and then another color from the start angle to the current angle along the other direction of the arc. To avoid redrawing an arc every time the current angle is updated, a layered animation approach can be used.

Figure 6:
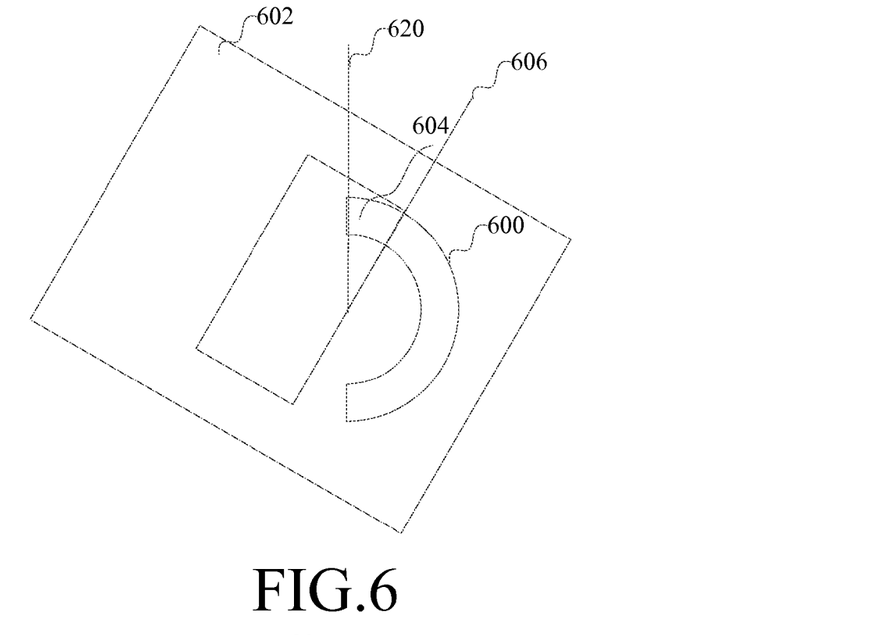
FIG. 6 is a diagram of animating a ring.
Figure 7:
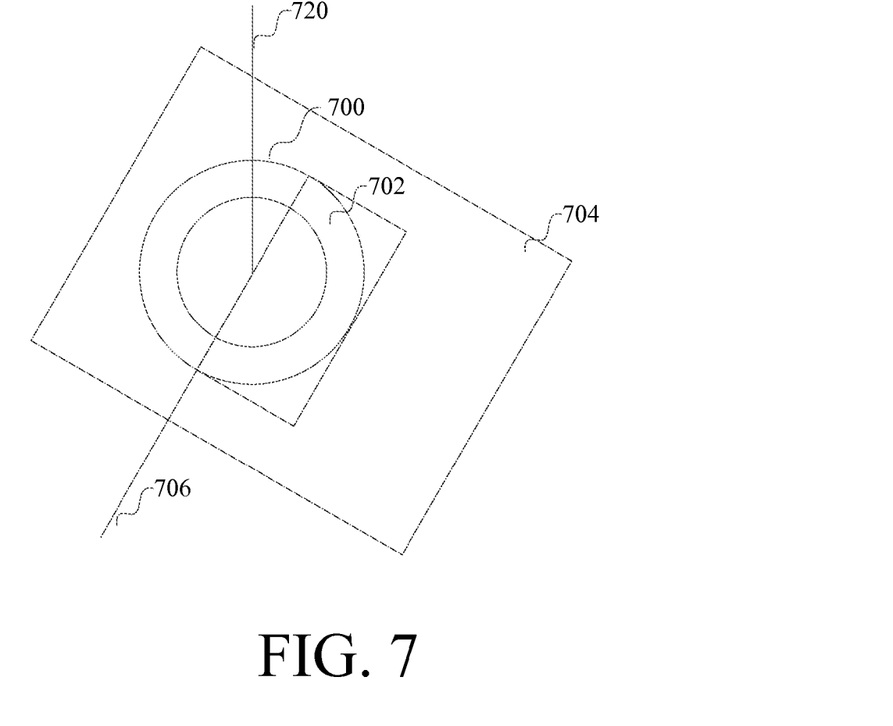
FIG. 7 is a diagram of animating a ring.

In particular, referring to FIGS. 6 and 7, an arc-shaped object is defined and associated with a clip object, such as a rectangle, that clips out unwanted segments of the arc. A rectangular clip object has a height corresponding to the outer diameter of the arc and a width corresponding to half of the outer diameter of the arc. The clip object is rotated dynamically, in response to the current angle as adjusted by the user, using a rotation transform. The clip objects have a rotation origin that maps to the center of the arcs. The arc is clipped by the rotated clip object. Multiple arc-shaped objects and corresponding clip objects can be defined and combined together as layers to produce the final graphic output for a ring.

Thus, in the example shown in FIGS. 6 and 7, one full ring and one half ring are layered on top of each other to create the arc between the start angle and the current angle in a clockwise direction, using the foreground color of the ring. These are layered on top of a background ring (in the background color) that provides the arc between the start angle and the current angle in the other direction to provide the full graphics for the ring to be displayed. The center and outside of the dial control can be provided by yet other graphics layers.

This example is for a start angle of 0 degrees located at the top of the dial as indicated at 620. When the current angle is between 0 and 180 degrees, the full ring is clipped out. The half ring 600 is clipped by a clip object 602. With a current angle, e.g., at 606, the region 604 of the half ring from the start angle 620 to the current angle 606 is visible, and the rest of the half ring is clipped out. The visible part 604 of the half ring is layered on top of the background ring. When the current angle becomes 180 degrees, the entire half ring is visible.

Referring to FIG. 7, when the current angle 706 from the start angle 720 is between 180 and 360 degrees, the entire half ring remains visible, and an unclipped clipped portion 702 of the full ring 700 is layered on top of the half ring. The clip object 704 is rotated to the current angle 706 and applied to the full ring to provide the clipped portion 702 of the full ring 700. Since the half ring is not clipped, the entire half ring, along with the unclipped portion of the full ring, together combine to represent the desired angle.

Figure 8:
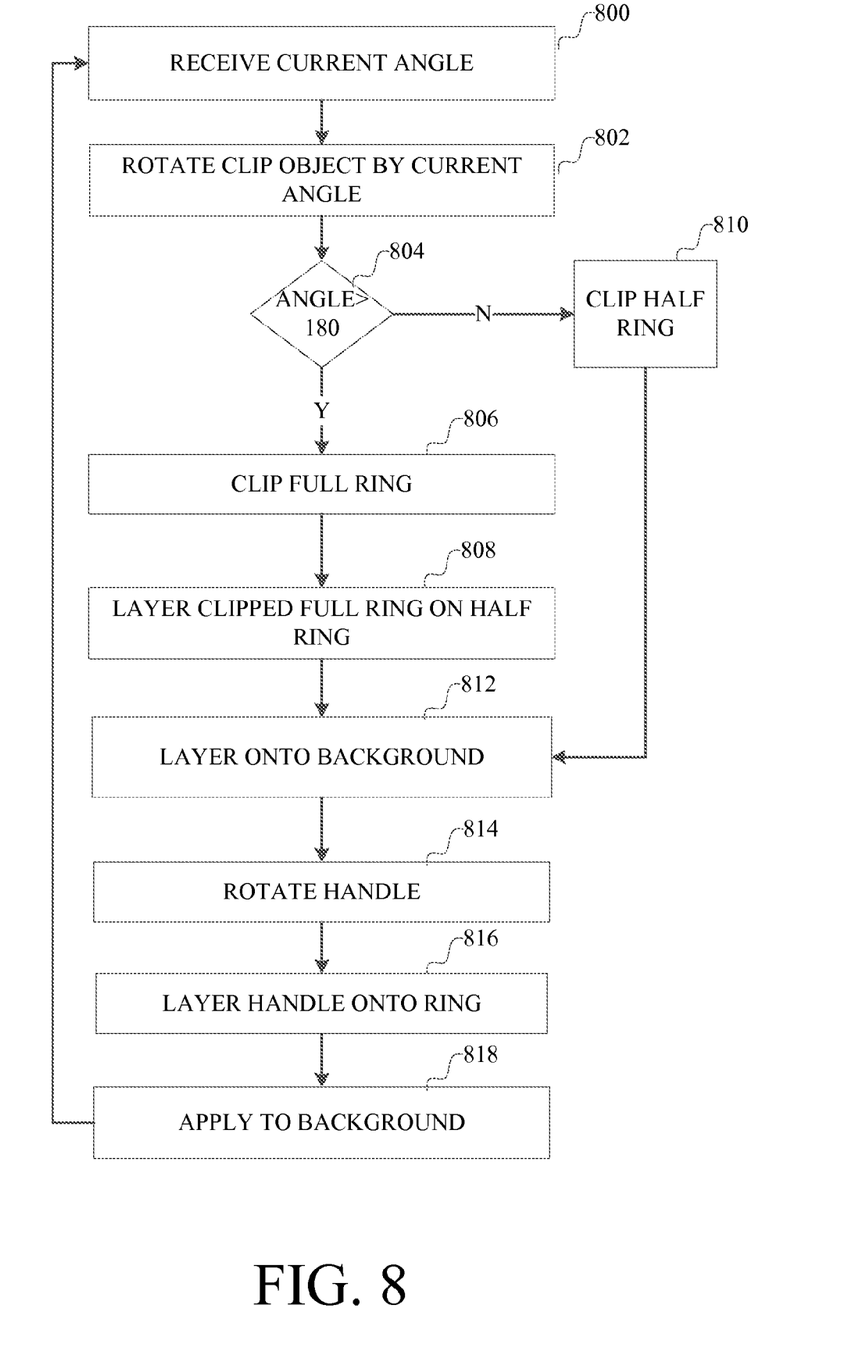
FIG. 8 is a flow chart describing animation of a ring.

Referring now to FIG. 8, a flow chart describing an implementation of such animation will now be described.

The current angle for the dial control is received 800. The clip object is rotated 802 by the current angle. If the current angle is greater than 180 degrees, as determined at 804, then the full ring is clipped 806 by the rotated clip object, and layered 808 on the unclipped half ring. Otherwise, the half ring is clipped 810 by the rotated clip object and the full ring is not used. The combined half ring and full ring, after clipping, are layered 812 onto the background ring. The graphic element of the handle also can be rotated 814 by the current angle. The rotated handle also can be layered 816 on the graphics for the ring. These combined objects then can be applied 818 to the background. The process repeats as the current angle is updated as indicated at 800.

In another implementation, the animation of the dial control is obtained using two full rings, each of which, when divided in half on its diameter, has one half in one color and the other half in another color. Given two rings of the same size and thickness, each ring is divided in half along its diameter. On both rings, one of the two halves is filled with the background color and the other half is filled with the foreground color. The rings will be placed on top of each other. The ring with the lower z-index is stationary, and the one with a higher z-index is rotated, and visibility is toggled between the rings, to give the illusion of an animation. As an example, with the handle starting at angle zero and rotating clockwise, the background half of the animating ring is opaque whereas the foreground half is transparent. After the angle reaches 180 degrees, the foreground half of the animating ring becomes opaque and the background half becomes transparent. At 360 degrees, the foreground half of the animating ring becomes transparent once again, and the background half becomes opaque, taking the animating ring back to its initial state.

Having now described an example implementation, a computer with which components of such a system are designed to operate will now be described. The following description is intended to provide a brief, general description of a suitable computer with which such a system can be implemented. The computer can be any of a variety of general purpose or special purpose computing hardware configurations. Examples of well-known computers that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 9:
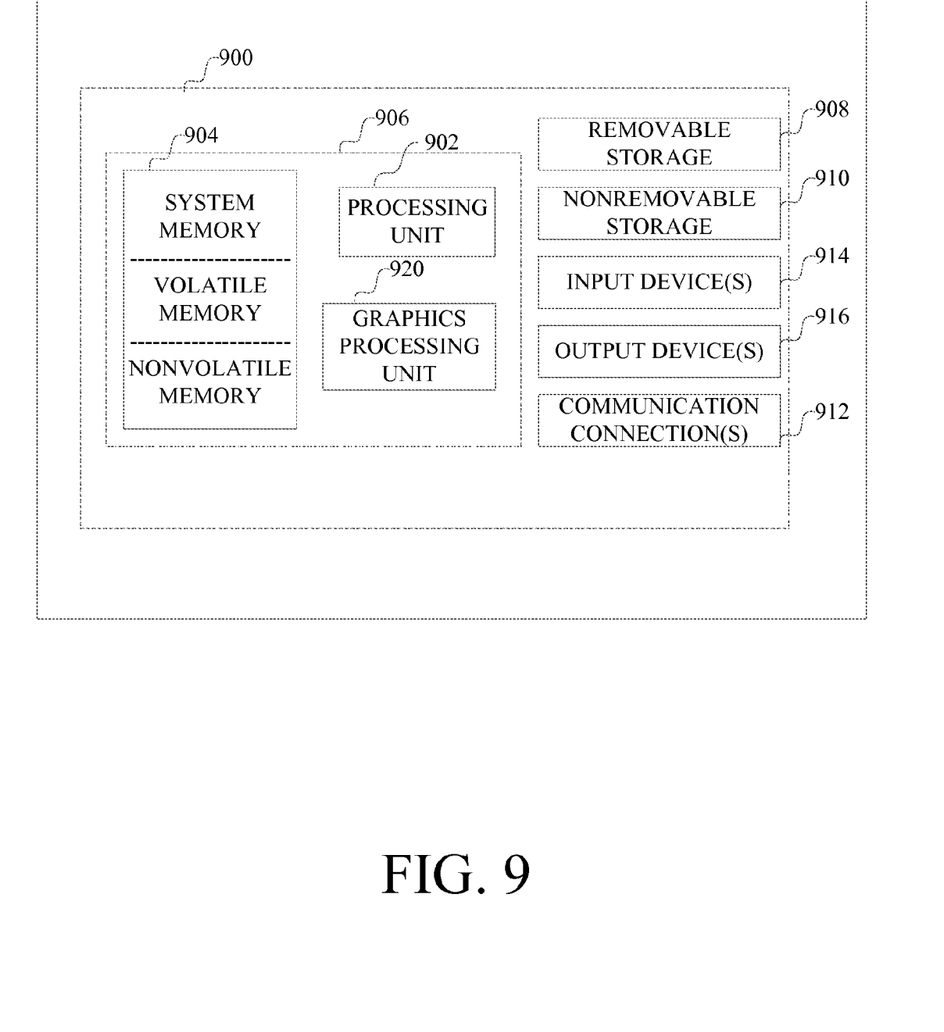
FIG. 9 is a block diagram of an example computer with which components of such a system can be implemented.

FIG. 9 illustrates an example of a suitable computer. This is only one example of a suitable computer and is not intended to suggest any limitation as to the scope of use or functionality of such a computer.

With reference to FIG. 9, an example computer 900, in a basic configuration, includes at least one processing unit 902 and memory 904. The computer may include multiple processing units and/or additional co-processing units such as graphics processing unit 920. Depending on the exact configuration and type of computer, memory 904 may be volatile (such as RAM), non-volatile (such as ROM, flash memory, etc.) or some combination of the two. This configuration is illustrated in FIG. 9 by dashed line 906.

Additionally, computer 900 may also have additional features/functionality. For example, computer 900 may also include additional storage (removable and/or non-removable) including, but not limited to, magnetic or optical disks or tape. Such additional storage is illustrated in FIG. 9 by removable storage 908 and non-removable storage 910. Computer storage media includes volatile and nonvolatile, removable and non-removable media implemented in any method or technology for storage of information such as computer program instructions, data structures, program modules or other data. Memory 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer 900. Any such computer storage media may be part of computer 900.

Computer 900 may also contain communications connection(s) 912 that allow the device to communicate with other devices over a communication medium. Communication media typically carry computer program instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 912 are devices that interface with the communication media to transmit data over and receive data from communication media, such as a network interface.

Computer 900 may have various input device(s) 914 such as a keyboard, mouse, pen, camera, touch input device, and so on. Output device(s) 916 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented by software, such as one or more computer programs, which include computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular abstract data types. This computer system may be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process performed by a processor in a computer, comprising:
   while receiving input into memory from an input device, repeating steps of:
   updating a current angle in memory based on at least the input;
   in response to updating the current angle, generating display data in memory defining a dial control based on at least the updated current angle, including determining a current value within a range of values based on the updated current angle, the dial control comprising:
      an arc-shaped graphical element comprising a ring having a first portion with first appearance, comprising color or texture, along an arc between a start angle and the updated current angle along a first direction along the arc from the start angle to the updated current angle, and a second portion with a second appearance, comprising color or texture and different from the first appearance, along the arc between the start angle and the updated current angle along a second direction opposite the first direction from the start angle to the updated current angle, the arc-shaped graphical element further indicative of the range of values, the determined current value positioned adjacent the arc-shaped graphical element, and a handle positioned at the updated current angle along the arc-shaped graphical element; and causing the generated display data for the dial control to be displayed on a display connected to the computer.

2. The computer-implemented process of claim 1, wherein generating the first portion of the arc-shaped graphical element includes applying a clip object to an arc-shaped object according to the current angle.

3. The computer-implemented process of claim 1, wherein the arc-shaped graphical element includes a plurality of rings, wherein each ring has an associated handle.

4. The computer-implemented process of claim 1, wherein updating comprises updating the current angle as a function of distance represented by the input.

5. The computer-implemented process of claim 1, wherein updating comprises updating the current angle as a function of speed represented by the input.

6. The computer-implemented process of claim 1, wherein the dial control further comprises a selection element displayed at a center of the arc-shaped graphical element.

7. An article of manufacture comprising:
a computer storage medium, comprising at least a memory or a storage device;
computer program instructions stored on the computer storage medium which, when processed by a processing device, instruct the processing device to perform a process comprising:
receiving input into memory from an input device;
updating a current angle in memory based on at least the input;
generating display data in memory defining a dial control according to the updated current angle, the dial control comprising:
an arc-shaped graphical element comprising a ring having a first portion with first appearance between a start angle and the updated current angle along a first direction from the start angle to the updated current angle, and a second portion with a second appearance, different from the first appearance, between the start angle and the updated current angle along a second direction from the start angle to the updated current angle, the arc-shaped graphical element further indicative of a range of values, and
a handle positioned at the current angle along the arc-shaped graphical element;
displaying the dial control on a display connected to the computer;
determining a current value within the range of values according to at least the updated current angle; and
displaying the determined current value on the display adjacent to the dial control.

8. The computer-implemented process of claim 7, wherein generating the first portion of the arc-shaped graphical element includes applying a clip object to an arc-shaped object according to the current angle.

9. The computer-implemented process of claim 7, wherein the arc-shaped graphical element includes a plurality of rings, wherein each ring has an associated handle.

10. The computer-implemented process of claim 7, wherein updating comprises updating the current angle as a function of distance represented by the input.

11. The computer-implemented process of claim 7, wherein updating comprises updating the current angle as a function of speed represented by the input.

12. The computer-implemented process of claim 7 wherein the dial control further comprises a selection element displayed at a center of the arc-shaped graphical element.

13. A computer, comprising:
a processing system comprising a processor and memory; and
storage configured to store computer program instructions that, when processed by the processing system, configures the processing system to:
receive input into memory from an input device;
update a current angle in memory based on at least the input;
generate display data in memory defining a dial control according to the updated current angle, the dial control comprising:
an arc-shaped graphical element indicative of a range of values, the arc-shaped graphical element comprising a ring having a first portion with first appearance, comprising color or texture, between a start angle and the updated current angle along a first direction from the start angle to the updated current angle, wherein the start angle is not fixed, and a second portion with a second appearance, comprising color or texture and different from the first appearance, between the start angle and the updated current angle along a second direction from the start angle to the updated current angle, and
a handle positioned at the current angle along the arc-shaped graphical element;
display the generated dial control on a display connected to the computer;
map the updated current angle to a current value within the range of values; and
display the current value on the display adjacent to the dial control.

14. The computer of claim 13, wherein to generate the first portion of the arc-shaped graphical element, the processing system is further configured to apply a clip object to an arc-shaped object according to at least the current angle.

15. The computer of claim 14, wherein the arc-shaped object is a full ring, and the processing system is further configured to combine a clipped full ring with a half ring to provide the first portion of the arc-shaped graphical element.

16. The computer of claim 13, wherein the processing system is further configured to layer the combined full ring and half ring on a background ring, wherein the background ring provides the second portion of the arc-shaped graphical element.

17. The computer of claim 13, wherein the arc-shaped object is a half ring, and the clipped half ring provides the first portion of the arc-shaped graphical element.

18. The computer of claim 13, wherein the processing system is further configured to layer the clipped half ring on a background ring, wherein the background ring provides the second portion.

19. The computer-implemented process of claim 2, wherein the arc-shaped object is a full ring, and the process further comprises combining a clipped full ring with a half ring to provide the first portion of the arc-shaped graphical element.

20. The computer program product of claim 8, wherein the arc-shaped object is a full ring, and the process further comprises combining a clipped full ring with a half ring to provide the first portion of the arc-shaped graphical element.

* * * * *